US011566930B2

(12) United States Patent
Seehoffer et al.

(10) Patent No.: US 11,566,930 B2
(45) Date of Patent: *Jan. 31, 2023

(54) SYSTEM AND METHOD FOR CORRECTING METER SIZING

(71) Applicant: Master Meter, Inc., Mansfield, TX (US)

(72) Inventors: Scott H. Seehoffer, Uniontown, PA (US); Jerry Potter, Mansfield, TX (US)

(73) Assignee: Master Meter, Inc., Mansfield, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/884,445

(22) Filed: May 27, 2020

(65) Prior Publication Data
US 2020/0284638 A1    Sep. 10, 2020

Related U.S. Application Data

(63) Continuation of application No. 15/091,155, filed on Apr. 5, 2016, now Pat. No. 10,704,946, which is a (Continued)

(51) Int. Cl.
*G01F 15/063* (2022.01)
*G01F 1/00* (2022.01)
(Continued)

(52) U.S. Cl.
CPC ............. *G01F 15/063* (2013.01); *G01F 1/00* (2013.01); *G01F 1/74* (2013.01); *G01F 15/066* (2013.01); *G01F 15/0755* (2013.01); *G01F 15/14* (2013.01)

(58) Field of Classification Search
CPC ........ G01F 15/063; G01F 1/00; G01F 1/8436; G01F 1/74; G01F 15/024; G01F 15/066;
(Continued)

(56) References Cited

U.S. PATENT DOCUMENTS 7,099,781 B1    8/2006  Heidi et al.
7,126,551 B2   10/2006  Winter
(Continued)

OTHER PUBLICATIONS

Johnson et al.; "Optimal Water Meter Sizing and Maintenance System (OSMS)"; presented at the Biennial Conference of the Water Institute of Southern Africa (WISA) held May 19-23, 2002, in Durban, South Africa.

*Primary Examiner* — Michael P Nghiem
(74) *Attorney, Agent, or Firm* — The Webb Law Firm

(57) ABSTRACT

A system, method, and computer program product for identifying an incorrectly sized utility meter having a measuring system for fluid passing through the utility meter, including monitoring a plurality of utility meters, each utility meter being installed at a utility location, receiving utility meter data, transmitted by at least one utility meter of the plurality of utility meters to a central computer including at least one processor, wherein the utility meter data comprises a measurement of a volumetric amount of fluid passing through the utility meter or other utility meter data for deriving the volumetric amount of fluid passing through the utility meter, identifying the incorrectly sized utility meter by detecting whether a flow rate associated with the volumetric amount of fluid passed through the utility meter is outside of a flow rate range; and providing an interactive interface to report/receive a status associated with the incorrectly sized utility meter.

17 Claims, 5 Drawing Sheets

Related U.S. Application Data continuation of application No. 12/960,212, filed on Dec. 3, 2010, now Pat. No. 9,322,694.

(60) Provisional application No. 61/267,994, filed on Dec. 9, 2009.

(51) Int. Cl.
    *G01F 1/74*     (2006.01)
    *G01F 15/06*     (2022.01)
    *G01F 15/075*     (2006.01)
    *G01F 15/14*     (2006.01)

(58) Field of Classification Search
    CPC ... G01F 15/0755; G01F 15/14; G01F 25/0007
    USPC .......................................................... 702/45
    See application file for complete search history.

(56) References Cited

U.S. PATENT DOCUMENTS

| | | | |
|---|---|---|---|
| 7,126,552 B2 | 10/2006 | Locatelli et al. | |
| 7,135,986 B2 | 11/2006 | Winter | |
| 7,343,795 B2 | 3/2008 | Winter | |
| 7,516,023 B2 | 4/2009 | Ferreira et al. | |
| 7,942,068 B2 | 5/2011 | Ao et al. | |
| 9,322,694 B2* | 4/2016 | Seehoffer | G01F 1/74 |
| RE47,407 E | 5/2019 | Winter | |
| 10,704,946 B2* | 7/2020 | Seehoffer | G01F 15/0755 |
| 2002/0065614 A1 | 5/2002 | Bugarin et al. | |
| 2002/0145568 A1 | 10/2002 | Winter | |
| 2003/0028333 A1 | 2/2003 | Olson | |
| 2003/0204335 A1 | 10/2003 | Bugarin et al. | |
| 2004/0056807 A1* | 3/2004 | Winter | G01F 15/0755 343/700 MS |
| 2005/0000302 A1 | 1/2005 | Winter | |
| 2005/0007260 A1 | 1/2005 | Winter et al. | |
| 2005/0066746 A1 | 3/2005 | Winter | |
| 2005/0171708 A1 | 8/2005 | Ferreira et al. | |
| 2006/0162467 A1 | 7/2006 | Winter | |
| 2007/0005273 A1 | 1/2007 | Heidi et al. | |
| 2007/0112536 A1 | 5/2007 | Artiuch et al. | |
| 2007/0119500 A1 | 5/2007 | Freund, Jr. et al. | |
| 2008/0149180 A1 | 6/2008 | Parris et al. | |
| 2008/0189056 A1 | 8/2008 | Heidi et al. | |
| 2010/0134304 A1 | 6/2010 | Weinstein et al. | |
| 2010/0302061 A1 | 12/2010 | Winter et al. | |
| 2011/0178733 A1* | 7/2011 | Seehoffer | G01F 1/00 702/45 |
| 2011/0254696 A1 | 10/2011 | Cornwall et al. | |
| 2012/0059602 A1 | 3/2012 | Hobbs | |
| 2016/0265957 A1* | 9/2016 | Seehoffer | G01F 15/14 |
| 2019/0271583 A1* | 9/2019 | Malinowski | G01F 15/0755 |

* cited by examiner

SYSTEM AND METHOD FOR CORRECTING METER SIZING

CROSS REFERENCE TO RELATED APPLICATIONS

This application is a continuation of U.S. patent application Ser. No. 15/091,155, filed on Apr. 5, 2016, now issued as U.S. Pat. No. 10,704,946, issued on Jul. 7, 2020, which is a continuation of U.S. patent application Ser. No. 12/960,212, filed on Dec. 3, 2010, now issued as U.S. Pat. No. 9,322,694, issued on Apr. 26, 2016, which claims priority to U.S. Provisional Application No. 61/267,994, filed Dec. 9, 2009, all of which are hereby incorporated by reference in their entireties.

BACKGROUND OF THE INVENTION

Field of the Invention

This invention relates to an apparatus to confirm correct meter sizing and, more particularly, to an apparatus to confirm that a water meter provided to a user by a utility is the proper size.

Discussion of Present Technology

The selection of water meter size for installations in buildings, e.g. commercial and residential buildings, can be made through a process that involves identification of the terminal water fittings and the expected water flow through the meter. In most instances, the process of determining meter size is usually only practiced when a meter is initially installed and when a replacement meter is installed. Seldom is the process to determine meter size practiced when changes occur that can effect water usage, e.g. but not limited to, the addition of a bathroom, the remolding of a bathroom and/or kitchen, the addition of outdoor water fittings to water the landscape, and/or an increase or decrease in the number of persons occupying the building.

As is appreciated by those skilled in the art, changes in the number of water fittings, changes in the number of persons occupying the building, and changes in water usage can result in the conversion of a properly sized installed water meter to an oversized, or an undersized water meter. The drawbacks with operating an oversized, or an undersized, water meter is a loss of revenue to the water utility, damage to the water meter, and varying water pressure in the pipes of the building. For a more detailed discussion on the subject matter of oversized and undersized water meters, reference can be made to the article titled "Optimal Water Meter Sizing and Maintenance System (OSMS)" authored by E. H. Johnson and B. E. Bold and presented at the Biennial Conference of the Water Institute of Southern Africa (WISA) held May 19-23, 2002, in Durba, South Africa.

In view of the need to monitor the flow through water meters to confirm correct meter sizing, it would be advantageous to provide a water meter that has facilities to monitor water flow and to confirm that the water meter installed is correctly sized.

SUMMARY OF THE INVENTION

This invention relates to an improvement to a meter register of the type having a sealed register body having a face portion and a body defining an internal cavity, and a member mounted within the sealed registered body adapted to measure liquid flow through the meter. An antenna is provided in the internal cavity to transmit information regarding the liquid flow through the meter. The improvement of the invention includes, among other things, a microprocessor in the sealed register body adapted to have a calculated water meter maximum flow rate and a calculated minimum flow rate, defined as the meter flow rate range. The member, mounted in the sealed body, co-acts with the microprocessor to determine flow rate and the microprocessor is adapted to forward a signal to the antenna when the flow rate of the meter is outside, or within, the meter flow rate range. The antenna is adapted to transmit the signal.

DESCRIPTION OF THE PREFERRED EMBODIMENTS

Figure 1:
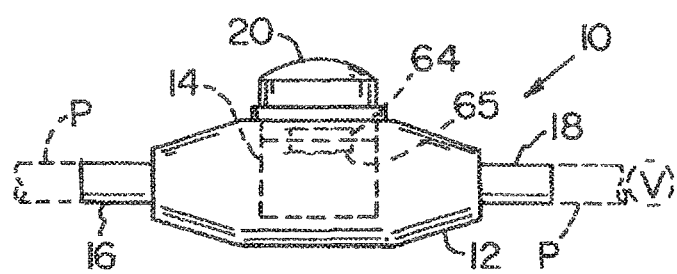
FIG. 1 is a side elevational view of a meter including a meter register that can be used in the practice of the invention.

As used herein, spatial or directional terms, such as "inner", "outer", "left", "right", "up", "down", "horizontal", "vertical", and the like, relate to the invention as it is shown in the drawing figures. However, it is to be understood that the invention can assume various alternative orientations and, accordingly, such terms are not to be considered as limiting. Further, all numbers expressing dimensions, physical characteristics, and so forth, used in the specification and claims are to be understood as being modified in all instances by the term "about". Accordingly, unless indicated to the contrary, the numerical values set forth in the following specification and claims can vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Moreover, all ranges disclosed herein are to be understood to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more and ending with a maximum value of 10 or less, e.g., 1 to 6.7, or 3.2 to 8.1, or 5.5 to 10.

Before discussing non-limiting embodiments of the invention, it is understood that the invention is not limited in its application to the details of the particular non-limiting embodiments shown and discussed herein since the invention is capable of other embodiments. Further, the terminology used herein to discuss the invention is for the purpose of description and is not of limitation. Still further, unless indicated otherwise in the following discussion, like numbers refer to like elements.

Non-limiting embodiments of the invention are directed to the practice of the invention on water meters; the invention, however, is not limited to water meters and any type of meter for measuring the flow of any type of a fluid can be used in the practice of the invention. Further, the invention will be directed to the type of water meter disclosed in U.S. Pat. No. 7,126,551 B2 (hereinafter also referred to as (USPN '551); the invention, however, is not limited thereto and can be practiced on any type of water meter. U.S. Pat. No. 7,126,551 B2 in its entirety is hereby incorporated by reference.

Figure 2:
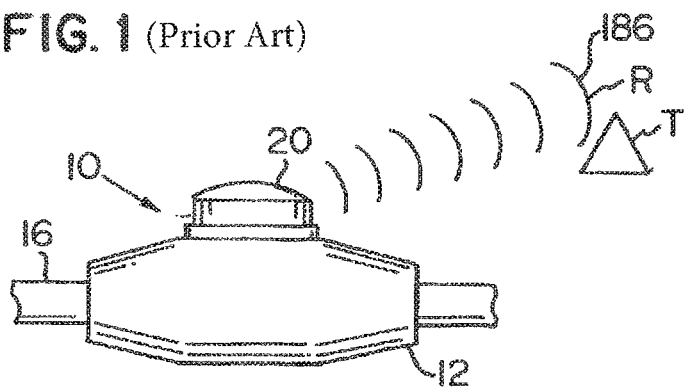
FIG. 2 is a side elevational view of the meter shown in FIG. 1 transmitting a signal to a receiver.

Shown in FIG. 1 is water meter 10 of the type disclosed in USPN '551. The water meter 10 includes a body 12 having a measuring chamber 14, an inlet 16, an outlet 18, and a register 20. The measuring chamber 14 can include many different types of measuring-type chambers, such as positive displacement chambers and/or a vane or a multi-jet type chamber. The inlet 16 and outlet 18 are adapted to be secured to piping P. The register 20 is a sealed register and in the non-limiting embodiment of the invention is magnetically coupled to the measuring chamber 14, which includes a magnetic drive arrangement that is well known in the art. The register 20 of the water meter 10 includes an arrangement to transmit and receive radio waves R as depicted in FIG. 2. The radio waves R are received by a transmission/receiving arrangement, such as a tower T.

Figure 3:
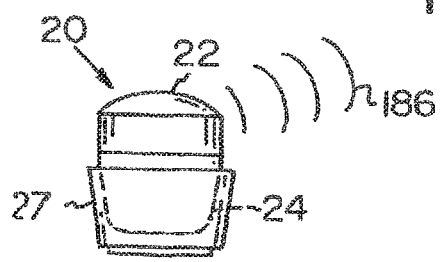
FIG. 3 is a side elevational view of a register that can be used in the practice of the invention.
Figure 4:
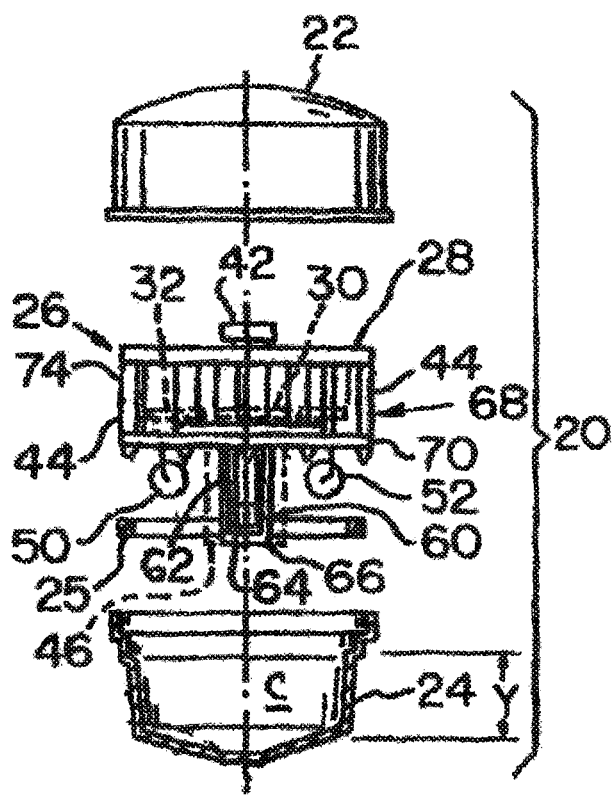
FIG. 4 is an exploded side elevational view, partially in section, of the register shown in FIG. 3.

With reference to FIGS. 3-6, as needed, the register 20 includes a face cap 22 attached to a metallic cup 24 (see FIGS. 3 and 4). Preferably, the face cap 22 is made of glass or a clear polymeric material and is fixably secured to the metallic cup 24, which can be made of copper or stainless steel. The metallic cup 24 can be received by a polymeric shroud 27 (see FIG. 3). The face cap 22 is mechanically sealed to the metallic cup 24 and includes a rubber gasket or seal 25 (see FIG. 14) to secure the face cap 22 and metallic cup 24 together and be held via a friction fit. An internal cavity C is defined by the face cap 22 and the metallic cup or bottom portion 24.

Figure 5:
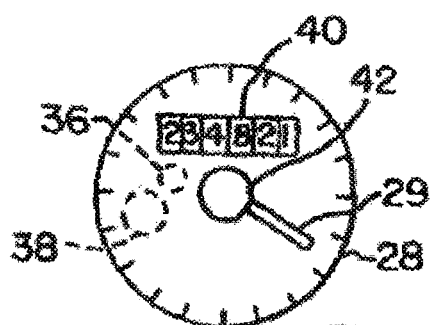
FIG. 5 is a top perspective view of a face plate and odometer of the register shown in FIGS. 3 and 4.

The register 20 includes a register subassembly 26. The register subassembly 26 includes a face plate 28, a dial 29 (clearly shown in FIG. 5), and a gear train drive 30. The gear train drive 30 includes a plurality of gears 32 co-acting with each other as shown in FIG. 4. Typically, the gears 32 are tooth gears that are meshed with one another. One of the gears 32S includes a magnet arrangement 34 that rotates about a sensing axis 140 (see FIG. 6). The magnet arrangement 34 takes the shape of a cruciform having four legs extending from a center, although any shape could be provided. The gear train drive 30 is coupled to a gear drive 36 positioned on the face plate 28 as shown in FIG. 5. The gear drive 36 includes meshed gears 38 which drive both an odometer 40 and a wheel dial 42, as well as a dial 29 (see FIG. 5). A plurality of spacer shafts 44 (see FIG. 4) is provided for spacing various boards of the register 20. A magnetic shield 46, shown in phantom in FIG. 4, is provided for anti-magnet protection. Clips are provided to connect meter components together, as is known in the art, including a circuit board 70. Batteries 50 and 52 are electrically coupled to the circuit board 70.

With particular reference to FIG. 4, a magnetic direction detection arrangement is provided on a lower portion of the subassembly 26 and includes magnetically activated reed switches. A magnetic drive arrangement 60 is provided and includes a shaft or extended shaft 62 and a magnetic coupling 64, which is adapted to co-act with a magnetic drive 65 (see FIG. 1) of the meter measuring chamber 14. A magnetic shield 66 or anti-magnetic housing is provided for protecting the electronics from magnetic fields. More specifically, the magnetic drive arrangement 60 includes the magnetic coupling 64 attached to and contained within the drive shaft 62. The drive shaft 62 is mechanically coupled to the gear drive train 30. With this arrangement, rotation of the drive shaft 62 provides the mechanical energy, i.e., force and torque, to drive the gear train drive 30.

Figure 7:
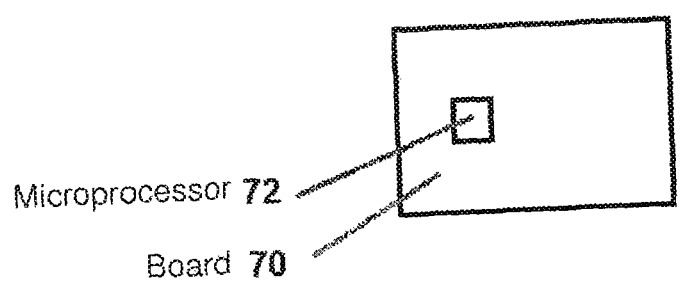
FIG. 7 is a view of a board that has a microprocessor.

As shown in FIG. 4, an electronics package 68 is provided within the register 20. The electronic package 68 includes the board 70 that has a microprocessor 72 shown in FIG. 7, which is electrically coupled to the batteries 50 and 52. The register 20 includes an antenna 74, e.g., a PIFA antenna, electronically coupled to the microprocessor 72. For a detailed discussion of the antenna, reference can be made to USPN '551. As an example, the register 20 transmits information through a series of character strings that essentially identify a base code, an I.D. code, a system code, an area code, a meter-type water consumption register, reverse flow consumption, status, and a billing factor. This information can be modified on a case-by-case basis. The present invention can transmit at radio frequencies of 10 dbm (10 mW) narrow band, 800-980 MHz frequency, or any other radio frequency, for example, per FCC (United States Federal Communications Commission).

Figure 6:
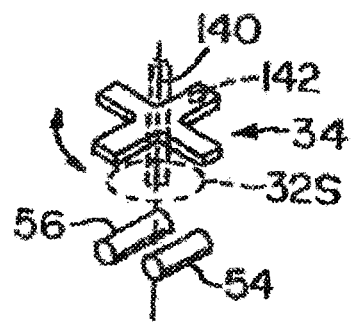
FIG. 6 is a top perspective view of the flow indicator of the meter register shown in FIG. 4.

The following discusses operation of the water meter 10. Initially, water passes through the inlet 16 causing the measuring chamber 14 to rotate. The water then flows through the outlet 18. The measuring chamber 14 causes the magnetic drive 65 attached to the measuring chamber 14 to rotate. The corresponding magnetic coupling 64 provided in the register 20 is likewise rotated, causing the drive shaft 62 to rotate. This in turn causes gears 32 of the gear train drive 30 to rotate, which in turn causes the odometer 40 to move indicating the quantity of liquid flowing through the meter. At the same time, the magnet arrangement 34 rotates causing the sensing magnet 142 to rotate about the reed switches 54 and 56 (see FIG. 6). Depending on the sequence of the state of the reed switches 54 and 56 as shown in FIG. 6, the microprocessor 72 can determine the number of rotations of the measuring chamber and the direction of rotation. In this manner, a signal can be provided to the antenna 74 indicating the number of rotations which, in turn, determines the volumetric amount of fluid passing through the meter. Also, in this manner, the position of the gear wheel 32S can be approximated by the state of the reed switches. Other types of position indicators can be used, such as that disclosed in U.S. Pat. No. 7,135,986, which is hereby incorporated by reference. The signal designated as 186 (see FIG. 2) is then transmitted through the antenna 74. The transmitted signal 186 is then picked up by a receiver 189 as disclosed in USPN '551.

Figure 8:
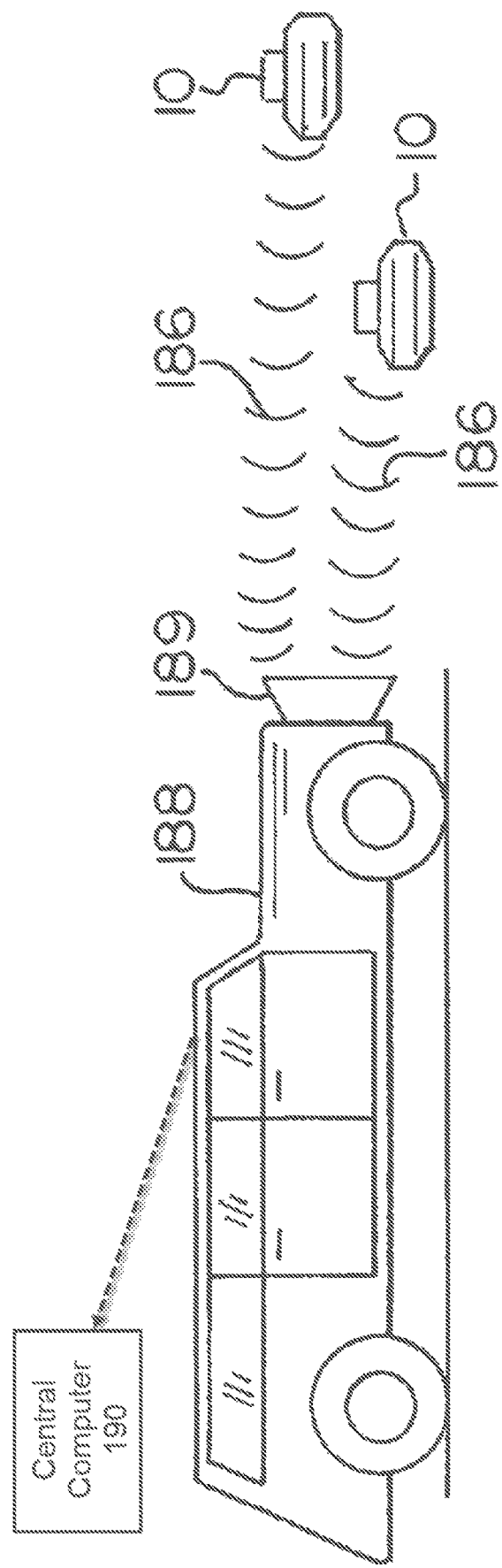
FIG. 8 is a schematic view showing a plurality of meters incorporating a meter register made in accordance with the present invention communicating with a receiver mounted on a vehicle.

The receiver 189 may, for example, be attached to a vehicle 188, as shown in FIG. 8. The vehicle 188 receives various packets or information transmitted from the (antenna 74 not shown) of meter 10. This information then can be transmitted to a central computer 190 which then can provide the information to the end user through various means, including the internet. Alternatively, the meter 10 can be read by a meter reader individual going through each meter, (i.e., an individual may carry a receiver and walk past the meters with the information transmitted by the respective antenna 74 and/or the auxiliary antenna 154 to a receiver 189.) Further, the information can be provided through a stationary receiver which can then either transmit another radio wave signal or send the information through telephone lines or the equivalent. Also, the signals can be received to a concentrator which then can be provided to a central source, such as, through an Application Service Provider (ASP), which will convert the information into a usable format, which both the utility and the user can access via the internet, for example. In this manner, neither the utility nor the user needs special software to obtain billing and usage information since the central source (ASP) would provide this information in a user-friendly format, as will be discussed below.

In the practice of the invention, the microprocessor 72, in addition to providing a signal to the antenna 74 indicating the volumetric amount of fluid passing through the meter, the microprocessor 72 also determines if the water meter is correctly sized. In one non-limiting embodiment of the invention, the expected water flow rate for the building, e.g. a residential home, is calculated in any usual manner, e.g. counting the number of terminal water fittings the building has and the expected flow rate through the meter. Based on the calculated flow rate, a properly sized water meter, to meet the calculated flow rate, is connected to the pipes P. The microprocessor 72 of the water meter is programmed with the maximum expected flow rate and the minimum expected flow rate, i.e., the meter flow rate range. In one non-limited embodiment of the invention, the water flow through the water meter is monitored, as described above and in USPN '551.

When the measured water flow rate is more than the maximum flow and certain other criteria programmed in the microprocessor 72, the microprocessor 72 sends a signal to the antenna 74 and the antenna 74 transmits a signal, e.g. an alarm signal to the utility that the installed meter is not the correct size. The other criteria could be the number of times that the flow rate exceeded the maximum flow rate. Also, other criteria could be the length of time that the flow rate exceeded the maximum flow rate. Other criteria could be the time intervals between when the flow rate exceeded the maximum flow rate. With this arrangement, no alarm signal transmitted from the water meter 10 is a confirmation that the installed meter is the correct meter size. As is appreciated, the microprocessor 72 can be programmed to send a continuous signal as long as the water flow rate through the meter 10 is within the flow rate range and discontinue the signal when the measured water flow rate is outside the flow rate range.

Some examples of undersized flow meters are as follows:
1. flow exceeding the maximum flow rate ten times; and/or
2. flow exceeding the maximum flow rate by a total amount of 1 hour; and/or
3. flow exceeding the maximum flow rate by ten times over the period of six months; and/or
4. flow through the meter exceeds recommended flow volume for a period of time, for example: 10,000 gallons over a three month period.

The microprocessor 72 can be programmed to monitor one or more of the above conditions and send an alarm to a utility if one or more of the conditions occur to indicate that the meter is undersized.

Referring to FIG. 8, in some embodiments, the register 20 can be utilized in connection with the vehicle 188 which can receive the meter reading signals 186 emitted from the antenna 74. Specifically, the vehicle 188 can travel a set meter reading route. Along that route, the receiver 189 will receive the various radio waves from respective meters 10. The vehicle 188 can be provided with computer assistance to store this information. This information, which includes consumption information, can be sent to a central computer 190 for billing and other information. The vehicle receiving unit can identify if it does not receive the signal from the meter designated on the route. This may indicate that an antenna wire was cut and/or the register was tampered with. An alternative arrangement can be provided that the meter antenna transmits meter reading information to a communication concentrator. This information can be forwarded via a communication line, such as, a modem line or radio waves to a central computer 190 for collation of the information. As described earlier, this information can then be sent to an ASP. This information can be analyzed for billing purposes.

Figure 9:
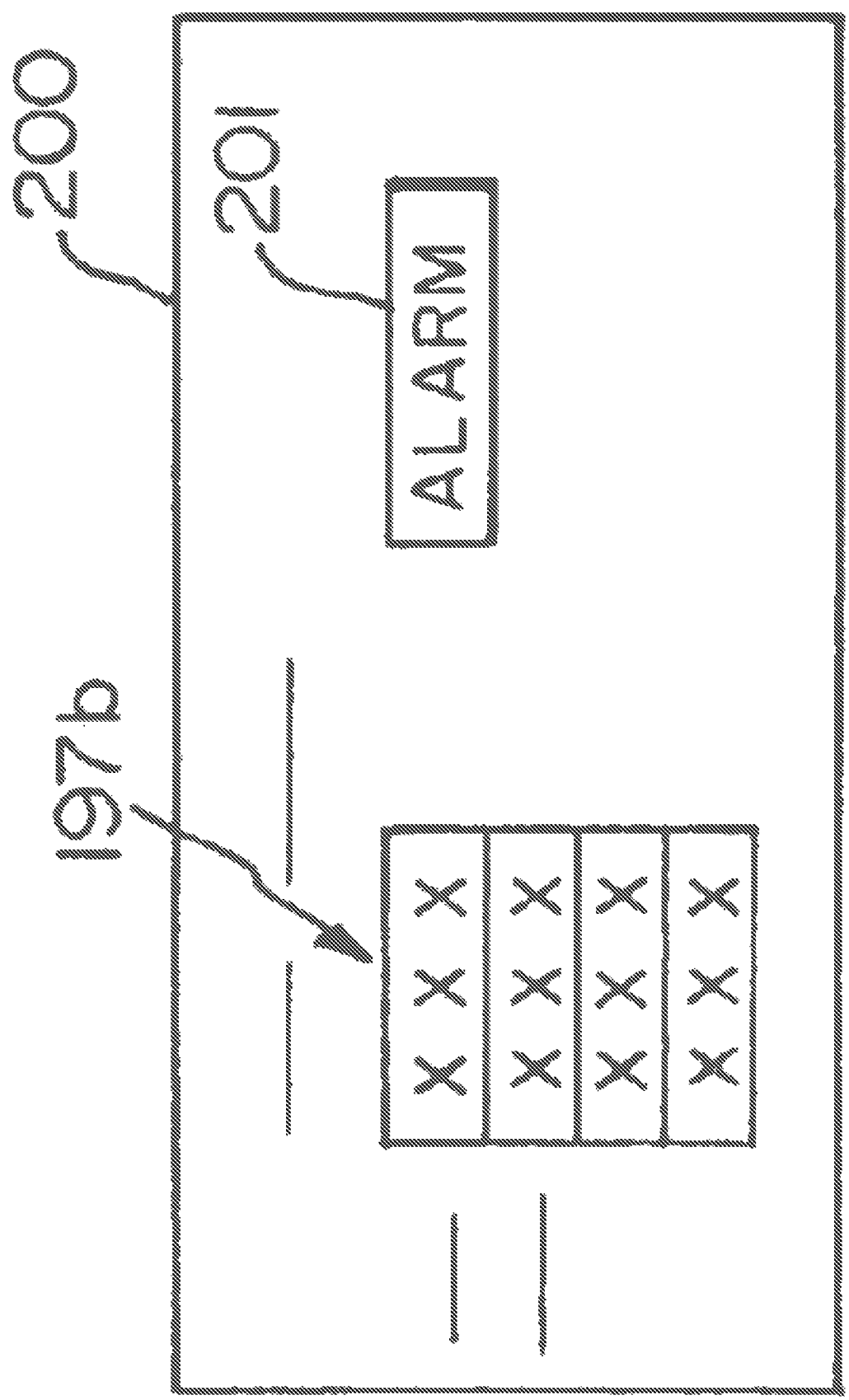
FIG. 9 is a schematic view of a computer screen showing utility consumption in some graph form.
Figure 10:
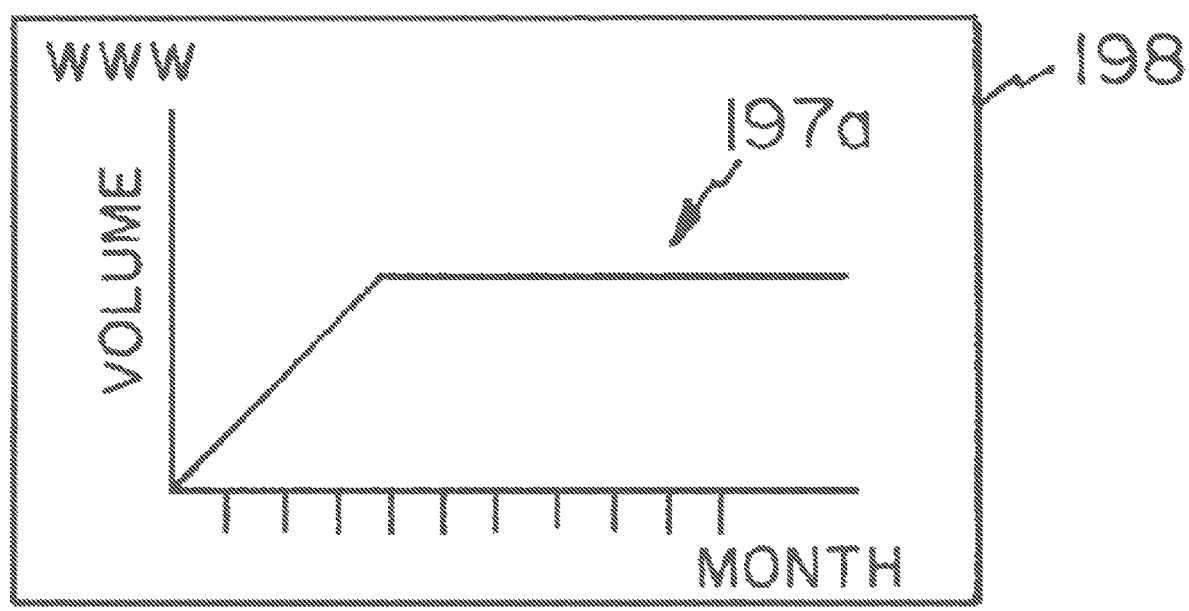
FIG. 10 is a schematic view of a computer screen showing utility consumption in numerical form.

Finally, the information transmitted via the antenna 74 can then be provided through a world-wide-web or internet-based system whereby the user or utility can obtain this information via typing into a computer the user's I.D. number and password at the ASP website. The present invention can also be used in the submetering market, where the submetering entity is responsible for collecting utility fees from users. Such information that may be obtained is meter usage 197*a* and billing information 197*b* via screens 198 and 200, such as, shown in FIGS. 9 and 10. This information may be presented in real time. Therefore, if a user needs to monitor utility consumption, he or she need only to log onto this website from anywhere throughout the world where internet access is available. Further, utilities and users may obtain information provided by an application (e.g., a web-based application) that provides information displayed in the application via respective reports. Further, if it is believed that there is a leak occurring or tampering of the meter, an e-mail message 201 (e.g., alarm, etc.) or automated message can be sent to the household or business for an emergency telephone number for further evaluation. For example, if a leak is detected in a home, the home owner could be e-mailed or telephoned at an emergency number to check whether a leak is occurring. Furthermore, a physical alarm can be provided on the meter, in which case, an alarm can be emitted from that meter. Also, an opening and closing valve (V) can be provided on the pipe p (e.g., as shown in FIG. 1), which can be remotely activated to an opened and/or closed position depending on the volume of water passing through the meter. As can be seen, the present invention solves many problems that are in existence in automatic meter reading technology.

As can be appreciated, the invention is not limited to the program of the microprocessor 72 and any program indicating that the water meter is not properly sized, based on current water flow rate, can be used in the practice of the invention. Further, as can be appreciated, the invention is not limited to the embodiments of the invention discussed herein, and the scope of the invention is only limited by the scope of the following claims.

The invention claimed is:

1. A method for identifying an incorrectly sized utility meter, the utility meter having a measuring system for fluid passing through the utility meter, comprising:
monitoring a plurality of utility meters, each utility meter of the plurality of utility meters being installed at a utility location;
receiving utility meter data, transmitted by at least one utility meter of the plurality of utility meters, at a central computer including at least one processor, wherein the utility meter data comprises a measurement of a volumetric amount of fluid passing through the at least one utility meter for deriving the volumetric amount of fluid passing through the at least one utility meter;
receiving, at the central computer from the at least one utility meter, a signal indicating whether a programmed criteria is satisfied, the programmed criteria defined to indicate that an installed meter is not a correctly sized meter based on the volumetric amount of fluid;
providing, by the central computer, the signal to a central source to convert the signal indicating the satisfied programmed criteria into a usable format; and
providing, an internet based system by the central source, to a user or utility for accessing the information associated with the signal.

2. The method of claim 1, wherein the programmed criteria is based on determining a minimum flow rate or a maximum flow rate outside of a flow rate range of the at least one utility meter.

3. The method of claim 1, further comprising: remotely activating an opening and closing valve to an open and/or a closed position depending on the volumetric of fluid passing through the at least one utility meter.

4. The method of claim 1, further comprising: detecting a flow rate comprising the volumetric amount of fluid passing through the at least one utility meter.

5. The method of claim 1, wherein the at least one utility meter transmits, via an antenna, the signal to the utility indicating that the installed meter is not the correct size.

6. The method of claim 5, wherein the at least one utility meter transmits the signal based on determining the measured water flow rate is more than the maximum flow.

7. The method of claim 1, wherein the at least one utility meter transmits the signal when the programmed criteria comprises a utility meter flow rate outside of a flow rate range for at least a predetermined period of time, a predetermined number of times, or a predetermined number of times during a predetermined time period.

8. The method of claim 1, wherein a flow rate of the volumetric of fluid passing through the at least one utility meter is derived from the utility meter data.

9. The method of claim 8, wherein the utility meter data includes a direction of a flow associated with the volumetric amount of fluid passing through the at least one utility meter.

10. The method of claim 8, wherein the utility meter data includes one or more time periods between one or more periods when the flow rate exceeded the maximum flow rate.

11. A system to identify an incorrectly sized utility meter, comprising:
at least one processor programmed or configured to:
monitor a plurality of utility meters, each utility meter of the plurality of utility meters being installed at a utility location;
receive utility meter data, transmitted by at least one utility meter of the plurality of utility meters, at a central computer including the at least one processor, wherein the utility meter data comprises a measurement of a volumetric amount of fluid passing through the at least one utility meter for deriving the volumetric amount of fluid passing through the at least one utility meter;
receive from the at least one utility meter, a signal indicating whether a programmed criteria is satisfied, the programmed criteria defined to indicate that an installed meter is not a correctly sized meter based on the volumetric amount of fluid;
provide the signal to a central source to convert the signal indicating the satisfied programmed criteria into a usable format; and
provide an internet based system to a user or utility for obtaining the information associated with the signal.

12. The system of claim 11, wherein the programmed criteria is based on determining a minimum flow rate or a maximum flow rate outside of a flow rate range of the at least one utility meter.

13. The system of claim 11, further programmed or configured to:
remotely activate an opening and closing valve to an open and/or a closed position depending on the volumetric of fluid passing through the at least one utility meter.

14. The system of claim 11, wherein the at least one utility meter transmits, via an antenna, the signal to the utility indicating that the installed meter is not the correct size.

15. The method of claim 11, wherein the at least one utility meter transmits the signal based on determining that the measured water flow rate is more than the maximum flow.

16. The system of claim 11, wherein the at least one utility meter transmits the signal based on determining at least one of the programmed criteria comprises a utility meter flow rate outside of a flow rate range for at least a predetermined period of time, a predetermined number of times, or a predetermined number of times during a predetermined time period.

17. A computer program product, comprising at least one non-transitory computer-readable medium including program instructions that, when executed by at least one processor, cause the at least one processor to:
monitor a plurality of utility meters, each utility meter of the plurality of utility meters being installed at a utility location;
receive utility meter data, transmitted by at least one utility meter of the plurality of utility meters, at a central computer including the at least one processor, wherein the utility meter data comprises a measurement of a volumetric amount of fluid passing through the at least one utility meter for deriving the volumetric amount of fluid passing through the at least one utility meter;
receive, from the at least one utility meter, a signal indicating whether a programmed criteria is satisfied, the programmed criteria defined to indicate that an installed meter is not a correctly sized meter based on the volumetric amount of fluid;
provide the signal to a central source to convert the signal indicating the satisfied programmed criteria into a usable format;
provide an internet based system to a user or utility for obtaining the information associated with the signal.

* * * * *